(12) United States Patent
Rögelein

(10) Patent No.: US 7,777,380 B2
(45) Date of Patent: Aug. 17, 2010

(54) ELECTRIC MOTOR

(75) Inventor: Dieter Rögelein, Stuttgart (DE)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/255,849

(22) Filed: Oct. 22, 2008

(65) Prior Publication Data

US 2009/0102301 A1    Apr. 23, 2009

(30) Foreign Application Priority Data

Oct. 22, 2007   (GB) .................................. 0720599.0

(51) Int. Cl.
   *H02K 5/16*      (2006.01)
   *H02K 15/12*     (2006.01)
(52) U.S. Cl. .......................................... 310/90; 310/45
(58) Field of Classification Search .................. 310/90, 310/45
   See application file for complete search history.

(56) References Cited

U.S. PATENT DOCUMENTS

| | | | |
|---|---|---|---|
| 2,104,188 A * | 1/1938 | Cotterman | 277/500 |
| 2,483,013 A | 9/1949 | Kopprasch | |
| 3,915,519 A * | 10/1975 | Lautner et al. | 384/412 |
| 4,820,948 A * | 4/1989 | Rogelein | 310/90 |
| 6,707,177 B1 * | 3/2004 | Campbell et al. | 310/45 |
| 2008/0284266 A1 * | 11/2008 | Yeung et al. | 310/90 |

FOREIGN PATENT DOCUMENTS

| | | |
|---|---|---|
| GB | 777490 | 6/1957 |
| GB | 2192312 | 1/1988 |
| GB | 2207956 | 2/1989 |
| JP | 10225046 | 8/1998 |
| JP | 11164510 | 6/1999 |
| JP | 2007 110795 A | 4/2007 |
| WO | WO-9813610 | 4/1998 |

\* cited by examiner

*Primary Examiner*—Quyen Leung
*Assistant Examiner*—Jose A Gonzalez Quinones
(74) *Attorney, Agent, or Firm*—Muncy, Geissler, Olds & Lowe, PLLC

(57) ABSTRACT

An electric motor has a wound rotor having a shaft, a rotor core, a commutator and windings wound about the rotor core and connected to the commutator. The motor has a stator confronting the rotor; brush gear electrically connecting the commutator to motor terminals; first and second bearings for rotatably supporting the rotor, and an oil collector fitted to the shaft between the commutator and the first bearing for preventing oil migrating along the shaft from the first bearing reaching the commutator. The oil collector is of high temperature material, preferably a metal such as brass, aluminum and steel. The oil collector returns the collected oil to the first bearing.

15 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 0720599.0 filed in Great Britain on 22 Oct. 2007.

FIELD OF THE INVENTION

This invention relates to an electric motor with a commutator and in particular to an oil migration barrier for such a motor.

BACKGROUND OF THE INVENTION

In small, fractional and subfractional horsepower, permanent magnet direct current motors, brush gear and a commutator are typically used to transfer electrical power from motor terminals to rotor windings. The commutator, which consists of copper segments laid on a commutator base, is located adjacent one of the bearings rotationally supporting the rotor. Such bearings are typically oil impregnated sintered bushings due to wear and cost considerations. One disadvantage of these bearings is that the oil is not sealed within the bushing and tends to migrate along the shaft. Such migration, if not checked, can extend to the commutator segments where the oil contaminates the brush/segment interface and mixes with brush dust ultimately rendering the motor inoperable by short circuiting commutator segments. Carbon brushes are hydroscopic and readily soak up oil. The brushes then become abrasive and quickly grind down the commutator segments. Oil migration is also a problem for ball and roller bearings, albeit not as great, especially in high temperature applications such as within the engine compartment of a vehicle.

In motors used over a wide range of temperatures, for example, the motors used in the engine compartment of a motor vehicle, such as the electronic throttle control motor, the motor for adjusting the vane angle in a turbocharger or supercharger, suction intake pipe actuator, swirl actuator, air flaps, and bypass flaps, etc, which must operate satisfactorily over a wide ambient temperature range, for example, from −40° C. to 180° C., the management of oil in the sintered oil impregnated bushings becomes problematic due to a difference in the coefficient of thermal expansion of the lubricating oil and the material of the bushings. Typical lubricating oils used in sintered bushings have a coefficient of thermal expansion between 2.2 to $3.4 \times 10^{-4}$, whereas typical sintered bushings have a coefficient of thermal expansion between 12 to $18 \times 10^{-6}$. At 180° C., the oil volume expands far greater than the volume for the oil in the bushing resulting in oil being pushed out of the bushing. Some of this oil migrates along the shaft. For the bushing at the commutator end of the motor, this oil migration causes a serious life issue. Should the migrating oil reach the commutator and contaminate the commutator segments, the motor will fail.

In the past slingers have been used to fling the migrating oil from the shaft on to the surrounding motor casing. The slinger looks like a washer fixed to the shaft. See, for example, GB2207956. However, this results in loss of oil and when the motor is then asked to operate in a low-temperature situation, e.g. at startup after a night in snow country, the oil volume which has been already reduced due to the loss of oil is now further reduced due to the thermal contraction. Thus resulting in the bushing running dry at the beginning, possibly producing an annoying squeaking noise. However, the squeaking noise is indicating a period of high metal on metal wear occurring at the shaft/bearing interface.

Also, in the modern engine compartment, these motors are often operated through a very limited range of motion and are expected to work first time, every time. By limited range of motion, typically less than 20 revolutions, maximum, in any one direction, which often is not enough to warm up the bearing oil enough to establish a hydraulic lubricating oil film. Indeed, some motors operate for just a few milli-seconds or less than one complete revolution. In such situations, the use of the standard oil slinger is not helpful as the oil is not slung off, and merely delays migration of the oil to the commutator but does not stop the oil.

GB2192312 address this problem by providing a rubber oil collector disc which traps the oil. However, being rubber, care and space is required to prevent the disc from coming into direct contact with the bearing. Also, the motor is not suitable for use in very high temperature applications. It is also not suitable for use in motors subjected to high vibration operating conditions. In addition, there may be problems associated with a possible chemical reaction between the oil and the rubber, out gassing of the rubber and the breakdown or aging of the rubber material over time.

Hence, there is a desire or need for a oil collector, which is more suitable for use over a wide temperature range.

There is also a secondary desire for such an improved oil collector, which can return collected oil to the bushing thereby creating an oil recirculating system. Thus retaining a high percentage of the oil.

SUMMARY OF THE INVENTION

Accordingly, the present invention provides an electric motor comprising: a wound rotor having a shaft, a rotor core, a commutator and windings wound about the rotor core and connected to the commutator; a stator confronting the rotor; brush gear connecting the commutator to motor terminals; first and second bearings for rotatably supporting the rotor; and an oil collector fitted to the shaft between the commutator and the first bearing for preventing oil migrating along the shaft from the first bearing reaching the commutator; wherein the oil collector is of high temperature material.

Preferably, the oil collector is of metal.

Preferably, the oil collector has a body portion for fixedly mounting to the shaft and an oil collecting portion.

Preferably, the oil collector is fixed to the shaft by an oil tight press fit. Most preferably, this press fit remains oil tight over the full range of operating temperatures, namely from −40° C. to +180° C.

Preferably, the body portion of the oil collector is adapted to make direct contact with an axial face of the first bearing.

Preferably, the body portion of the oil collector is adapted to function as a spacer and is fixed fast to the shaft to limit movement of the shaft through the first bearing in a first direction.

Preferably, the first bearing is an oil impregnated sintered bushing.

Preferably, the bushing is a self aligning bushing. Alternatively, the bushing may be a sleeve bushing.

Preferably, the oil collecting portion of the oil collector extends radially outwardly from the body portion and has an annular cavity open towards the first bearing.

Preferably, the annular cavity has a radially inwardly extending lip on the radially outer edge of the opening.

Preferably, the opening is spaced from the shaft and the diameter of the outer edge of the opening is greater than the diameter of the bearing.

Preferably, the bushing has a body portion and an axially extending cylindrical portion having a lesser diameter than the body portion.

Preferably, the lip of the oil collector locates radially about the cylindrical portion of the bushing.

BRIEF DESCRIPTION OF THE DRAWINGS

Preferred embodiments of the invention will now be described, by way of example only, with reference to the accompanying drawings, in which.

DETAILED DESCRIPTION OF THE PREFERRED EMBODIMENTS

Figure 1:
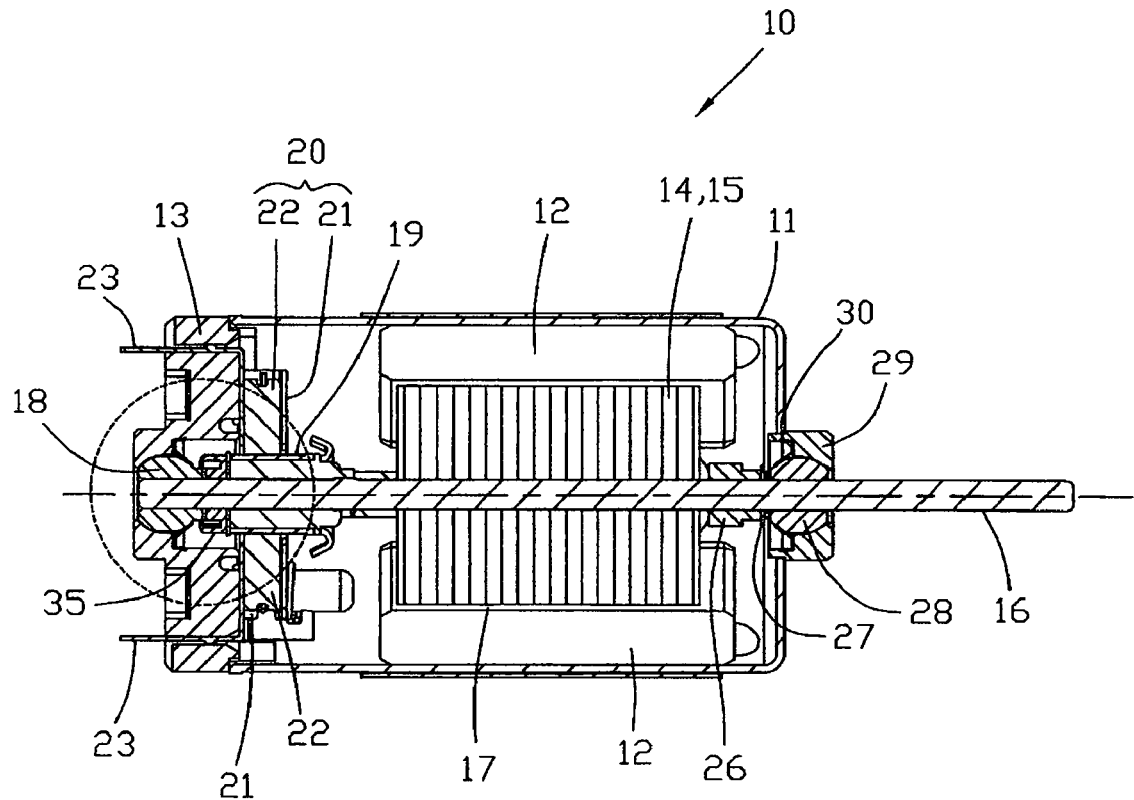
FIG. 1 is a section view of a subfractional horsepower PMDC motor according to a preferred embodiment of the present invention.

The motor of FIG. 1 is a typical the PMDC motor 10 which has been modified to operate in a wide temperature environment, such as in the engine compartment of a motor vehicle. In such an environment the temperature may vary within a range of −40° C. to +180° C. The motor may be used, for example, to drive the throttle valve or butterfly valve in a carburetor system of the engine.

The motor 10 has a deep drawn cup shaped metal housing 11, supporting permanent magnets 12 forming the stator for the motor. A plastics material end cap 13 closes off the open end of the housing. A rotor 14, comprising a rotor core 15 mounted on a shaft 16 is disposed within the housing 11 such that the rotor core 15 confronts the magnets 12 across an air gap 17. The shaft 16 extends through the housing 11 and the end cap 13 and is journalled in bushings 18, 28, fitted to the end cap 13 and the closed-end of the housing 11. The rotor 14 also comprises the commutator 19 fitted to the shaft 16 adjacent a rotor core 15 and windings (not shown for clarity) wound around poles of the core and electrically connected to segments of the commutator 19. The end cap 13 supports brush gear 20 for transferring electrical power to the windings. The brush gear comprises a pair of brush cages 21 slidably securing a respective cage brush 22 electrically connected to a respective motor terminal 23.

The bushing of the end cap 13, hereinafter referred to as the first bushing 18, is of the self aligning type, which means that it is pivotably fixed to the end cap. The first bushing 18 has a body portion 24 which is spherical and an axially extending cylindrical portion 25, forming a shank, which projects towards the commutator 19.

It would be readily realized by persons skilled in the art that a sleeve bushing, with or without the shank could be used in place of the self aligning first bushing 18.

The bushing of the housing 11, hereinafter referred to as the second bushing 28, is also a self aligning bushing having a substantially spherical appearance, which is pressed into engagement with a bearing hub 29 formed in or fitted to the closed end of the housing 11 by a spring 30. A collar 26 is fitted to the shaft 16 to limit axial movement of the rotor and forms an abutment which contacts the second bushing 28 through a low friction washer 29.

It would be readily realized by persons skilled in the art that a sleeve bushing or a ball bearing could be used in place of the self aligning second bushing 28.

Figure 2:
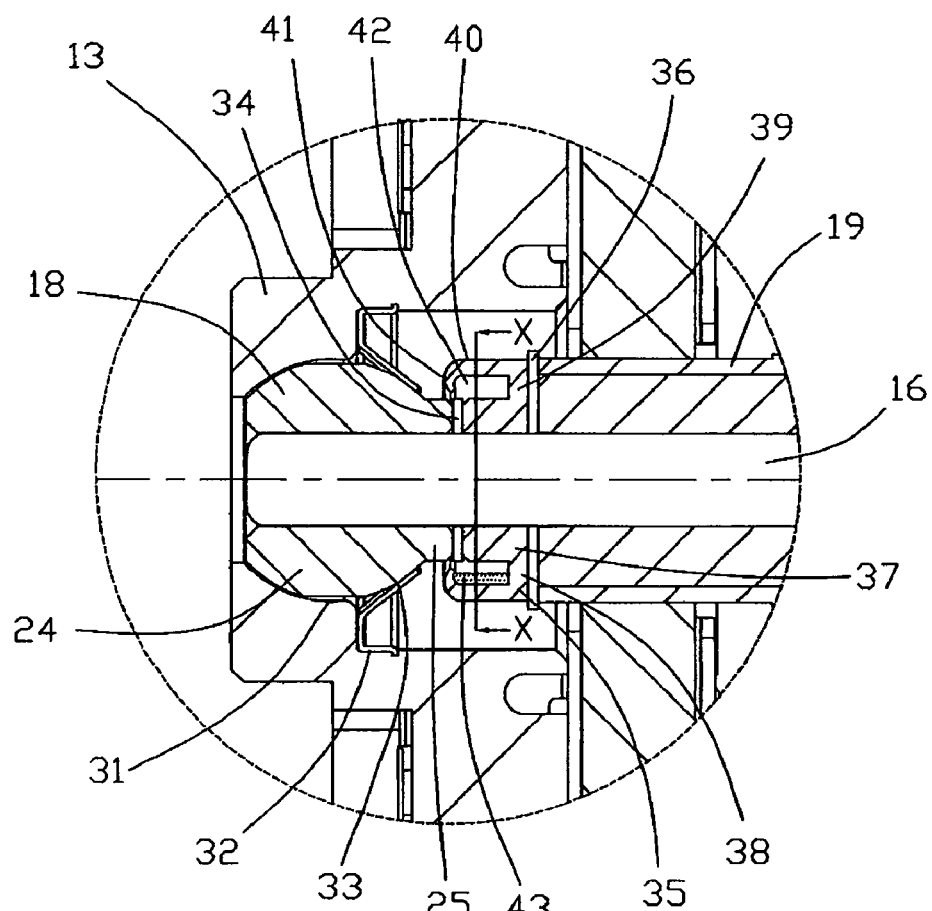
FIG. 2 is an enlarged sectional view of a bearing assembly, being a part of the motor of FIG. 1.

A portion of the end cap assembly is shown enlarged in FIG. 2. The spherical portion 24 of the first bushing 18 mates with a partly spherical bearing recess 31 in the end cap 13 and is urged into engagement by a spring, known as a bearing retainer 32, which is press fitted into an outer portion of the bearing recess 31. The bearing retainer 32 has resilient fingers 33, which engage the spherical portion 24 of the first bushing 18 to retain it. The cylindrical portion 25 projects axially inwardly passed the fingers 33 of the bearing retainer 32 towards the commutator 19.

Between the commutator 19 and the first bushing 18 is an oil collector 35. The oil collector 35 is pressed onto the shaft 16 in an oil tight manner. In the preferred embodiment shown, the oil collector 35 is located abutting an axial face of the commutator through an insulating washer 36, with a washer 34 of metal or other friction reducing material located between the oil collector 35 and the first bushing 18. However, the proximity of the oil collector 35 to the commutator 19 is not material to the working of the oil collector 35 and the insulating washer 36 is thus optional.

The oil collector 35 has a body portion 37 and oil collecting portion 38. The body portion 37 is optionally cylindrical with a through hole for receiving the shaft 16. The body portion 37 is preferably a press fit onto the shaft 16 and is fixed to the shaft 16 in an oil tight manner to prevent oil migrating along the shaft passing between the shaft 16 and the oil collector 35. Bearing adhesive may be used to ensure an oil tight fit. It is, however, highly preferable that the press fit is an oil tight press fit which remains oil tight over the full range of operating temperatures, namely, from −40° C. to +180° C. for the automotive application.

The collector portion 38 of the oil collector 35 extends from the body portion 37 in an integral, one-piece, monolithic construction. The radial height of the oil collector 35 is restricted as the oil collector is fitted to the shaft 16 before the rotor 14 is fitted to the end cap 13, which supports the brush gear 20, thus the oil collector 35 must pass between the brush cages 21 during assembly. In this embodiment, the brush gear 20 comprises two cage brushes 22, which make sliding contact with the commutator to transfer electrical power thereto. The cages 21 approach the commutator surface to provide stable support for the brushes 22 but this close support limits the radial height of the oil collector 35, giving the collector a squat appearance. Thus, the oil collector portion 38 has a radial portion 39, an axial portion 40 and a lip 41. The radial portion 39 extends radially and from the body portion 37, preferably, but not necessarily, at an edge of the body portion 37 remote from the bushing 18 to maximize the volume of the oil collector portion 38. The axial portion 40 extends from the radial portion 39 towards the first bushing 18. The distal end of the axial portion 40 optionally surrounds at least a portion of the cylindrical portion 25 of the first bushing 18 and the intervening washer 34, if present. The lip 41 extends radially inward at the distal end of the axial portion 40. Optionally, the lip 41 is partially reentrant, to positively trap migrating oil.

The radial portion 39, axial portion 40 and lip 41 form an annular cavity or oil collecting space 42, which retains migrating oil rather than slinging it away from the shaft. Such slinging usually means the oil coats an inner surface of the end cap and could drip on to the commutator.

Optionally, the oil collector is adapted to allow the collected oil to return to the bushing 18. This is achieved through the location of the lip 41 and optionally by the shape of the lip.

Figure 3:
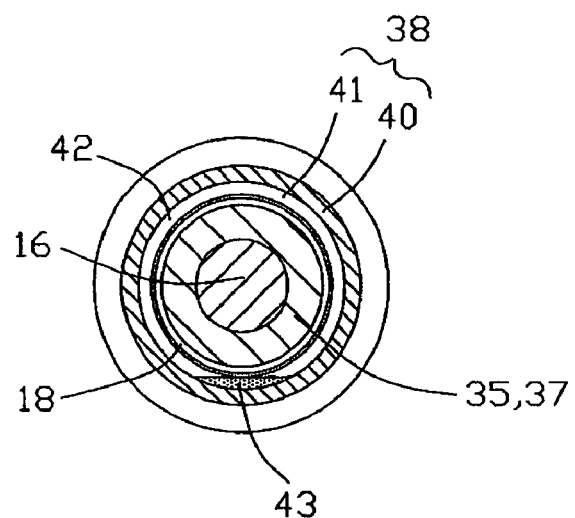
FIG. 3 is a cross sectional view, taken along line X-X, of the assembly of FIG. 2.

In the arrangement shown in FIG. 2, assuming the motor is mounted horizontally as shown, at rest oil 43 will pool to the bottom of the oil collecting space 42 until it reaches the top of the lip 41 at its lowest point has illustrated in FIG. 2 and in the cross-section view of FIG. 3.

As migrating oil is collected, it is retained by the lip 41 and pools at rest in the bottom of the oil collecting space 42 until the oil level rises above the lip 41, at which time the oil 43 bridges the gap between the lip 41 and the bushing 18 whereby as the bushing cools the oil 43 returns to the bushing 18 under capillary action, thus returning lost oil to the bushing 18. The oil collector now functions as an oil recirculating system.

Alternatively, oil may drip from the oil collector onto the first bushing. This 'dripping back recirculation' works for all positions with shaft horizontal within a deviation of −45° to +45° depending on the chosen shape of the oil collecting space 42. It will not work for recirculation with the shaft vertical and the bearing on top. In this orientation, the only function is to collect the migrating oil and prevent it from reaching the commutator. However, recirculation will occur when the shaft is vertical if the commutator is above the first bushing. In this situation, any oil collected by the collector can drip directly onto the bushing.

The dripping recirculation occurs when the collected oil 43 is on the top side of the oil collecting space which may occur when the motor is rotated and stopped. For example the motor may be rotated through 180° or odd multiples thereof. The oil may then, under gravity, drip from the lip 41 to the bushing 18 below, especially the shank 25. Some of the oil 43 may remain in the oil collecting space 42 to be dripped out at a future time following operation of the motor. The remaining oil again pools at the bottom of the oil collecting space.

Figure 4:
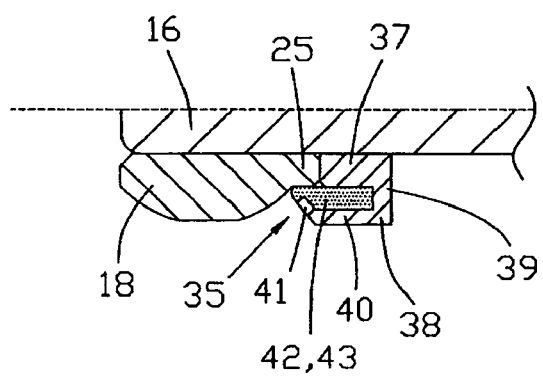
FIG. 4 is an enlarged sectional view of a modified bearing assembly.

FIG. 4 illustrates an alternative lip arrangement. The lip 41 extends radially inwardly and axially outwardly and thus under centrifugal action during rotation of the rotor, still positively holds or retains oil but when stationery delivers the oil further axially along the cylindrical portion 25 of the first bushing 18. Here the lip 41 is located radially about the cylindrical portion 25 of the bushing. This assists the return of collected oil to the bushing.

The oil collector 35 is of a high temperature material, preferably bronze, brass or steel, so that the coefficient of thermal expansion can be similar to that of the material the shaft 16. Thus maintaining the oil tight connection between the oil collector and the shaft over a wide temperature range.

The outer surface of the oil collector 35 may be treated so as to have or form a oleophobic surface to further prevent oil migration over the outer surface of the oil collector 35.

When the oil collector 35 is made of metal, the body portion 37 may be adapted to make direct contact with the first bushing 18 (as shown in FIG. 4). Thus eliminating the need for the low friction washer (washer 34 of FIG. 2) which normally would be provided between the oil collector and the first bushing.

The low friction washer can be eliminated also if the oil collector is made of suitable, low friction engineering plastics, but such material may lose the advantage of the similarity of the coefficient of thermal expansion.

Although the invention has been described with reference to a preferred embodiment, it should be appreciated by those in the art that various modifications are possible within the scope of the invention. Therefore, the scope of the invention is to be determined by reference to the claims that follow.

For example, while the preferred bushing is shown as a self aligning bushing, a sleeve bushing would be acceptable and it is desirable, although not essential, that the bushing have a shank formed by an axially extending cylindrical portion of diameter generally less than the major diameter of the bushing. Sleeve bushings may be directly press fitted into bearing cavities formed in the end cap or motor housing.

Figure 5:
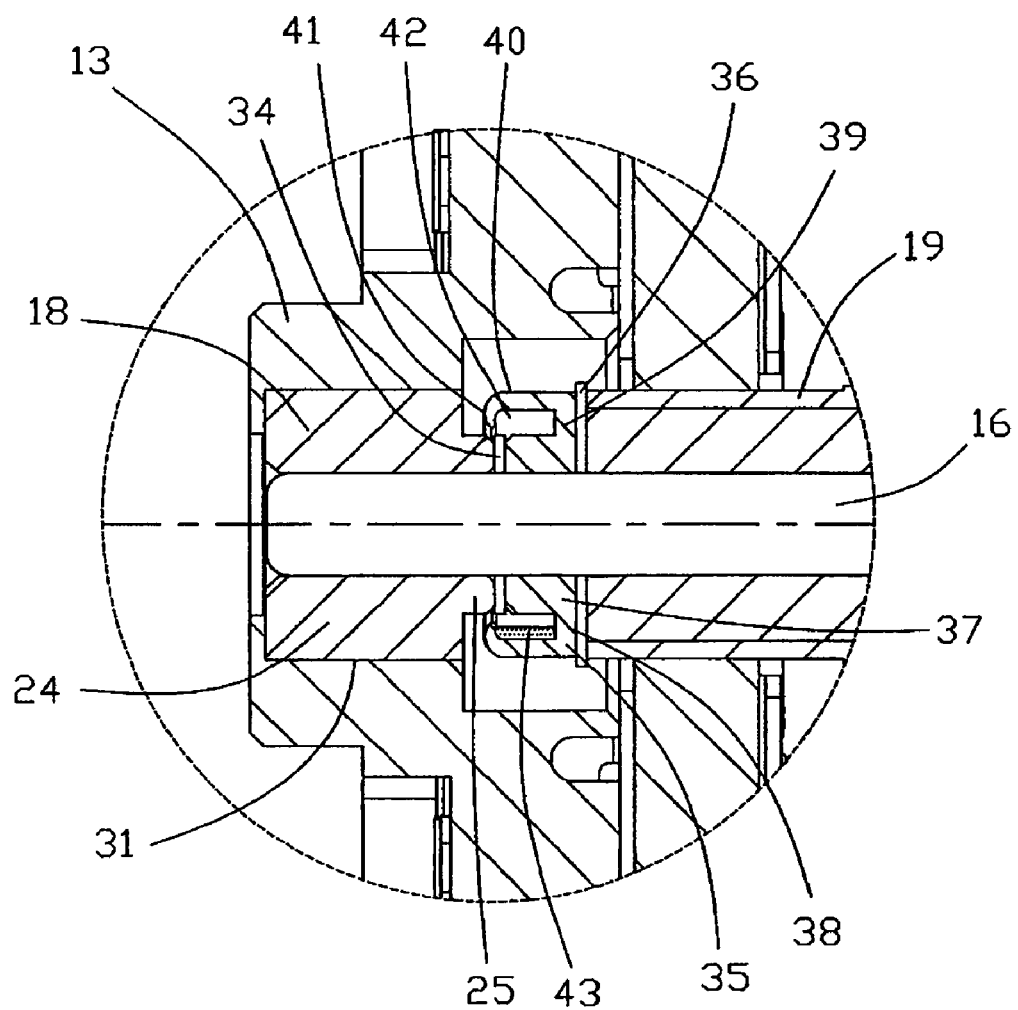
FIG. 5 is an enlarged sectional view of an alternative bearing assembly.

FIG. 5 illustrates an example where the first bushing 18 is a sleeve bushing having a body portion 24 and a shank formed by an axially extending cylindrical portion 25. The body portion 24 is cylindrical and pressed into a bearing recess in the end cap 13.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising:
   a wound rotor having a shaft, a rotor core, a commutator and windings wound about the rotor core and connected to the commutator;
   a stator confronting the rotor;
   brush gear connecting the commutator to motor terminals;
   first and second bearings for rotatably supporting the rotor, where the first bearing is an oil impregnated sintered bushing having a body portion and an axially extending cylindrical portion having a lesser diameter than the body portion; and
   an oil collector fitted to the shaft between the commutator and the first bearing for preventing oil migrating along the shaft from the first bearing reaching the commutator;
   wherein the oil collector is of high temperature material and has a lip located radially about the cylindrical portion of the bushing.

2. The electric motor of claim 1, wherein the oil collector is of metal.

3. The electric motor of claim 1, wherein the oil collector has a body portion for fixedly mounting to the shaft and an oil collecting portion.

4. The electric motor of claim 1, wherein the oil collector is fixed to the shaft by an oil tight press fit.

5. The electric motor of claim 1, wherein the body portion of the oil collector makes direct contact with an axial face of the first bearing.

6. The electric motor of claim 1, wherein the body portion of the oil collector functions as a spacer and is fixed fast to the shaft to limit movement of the shaft through the first bearing in a first direction.

7. The electric motor of claim 1, wherein the bushing is a self aligning bushing.

8. The electric motor of claim 1, wherein the bushing is a sleeve bushing.

9. The electric motor of claim 1, wherein the oil collecting portion of the oil collector extends radially outwardly from a body portion of the oil collector and has an annular cavity open towards the first bearing.

10. The electric motor of claim 9, wherein the annular cavity has a radially inwardly extending lip on the radially outer edge of the opening.

11. The electric motor of claim 9, wherein the opening is spaced from the shaft and the diameter of the outer edge of the opening is greater than the diameter of the cylindrical portion of the bearing.

12. An electric motor comprising:
- a wound rotor having a shaft, a rotor core, a commutator and windings wound about the rotor core and connected to the commutator;
- a stator confronting the rotor;
- brush gear connecting the commutator to motor terminals;
- first and second bearings for rotatably supporting the rotor, where the first bearing is an oil impregnated sintered bushing having a body portion and an axially extending cylindrical portion having a lesser diameter than the body portion; and
- an oil collector fitted to the shaft between the commutator and the first bearing for preventing oil migrating along the shaft from the first bearing reaching the commutator;

wherein the oil collector is of high temperature material and has a body portion and a collector portion, the collector portion including a radial portion extending radially, an axial portion extending from the radial portion toward said first bearing and a lip extending radially inward at a distal end of the axial portion, said lip extending about the cylindrical portion of the bushing.

13. The electric motor according to claim 12, wherein the distal end of the axial portion surrounds a portion of the cylindrical portion of the first bearing.

14. The electric motor according to claim 12, wherein the body portion of the oil collector is in contact with the cylindrical portion of the first bearing.

15. The electric motor according to claim 12, wherein the body portion of the oil collector is in contact with a washer which is in contact with the cylindrical portion of the first housing.

* * * * *